Sept. 12, 1933.  F. H. MOREHEAD  1,926,107
SEALING DEVICE
Filed March 17, 1932

INVENTOR.
French H. Morehead
BY Albert J. Henderson
his ATTORNEY.

Patented Sept. 12, 1933

1,926,107

UNITED STATES PATENT OFFICE 1,926,107

SEALING DEVICE

French H. Morehead, Brookline, Mass., assignor to Walworth Patents Inc., Boston, Mass., a corporation of Massachusetts Application March 17, 1932. Serial No. 599,411

14 Claims. (Cl. 285—90)

This invention relates to sealing devices and more particularly to a flexible sealing device for use in connection with pipe joints and the like and to the method of forming the seal.

One object of the invention is to prevent leakage at the joint at all times, and particularly when the joint is subjected to stress from pressure or from expansion and contraction of the connected ends due to variations in temperature.

Another object of the invention is to permit ample scope of movement of the connected ends forming the joint without disturbing the sealing effect of the sealing device.

Another object of the invention is to provide a sealing device which is entirely independent of the mechanical connection between the connected ends forming the joint.

Another object of the invention is to provide a means for readily sealing the joint between the adjacent ends of pipes and the like under adverse conditions such as are encountered when a pipe line is being installed or repaired.

Another object of the invention is to facilitate the sealing of a joint between connected ends of different materials.

Another object of the invention is to permit the use of high pressures and temperatures without detrimental effect upon the sealing properties of the sealing device.

The high pressures and high temperatures now encountered in pipe lines render it necessary to incorporate some form of yielding or flexible joint between the connected ends of pipes, fittings, or valves, and the like, the connected ends being usually flanged and bolted together. Flexibility is necessary because a fluid of high temperature in a pipe line will increase the magnitude of the initial set taken by the bolts and flanges, and as the high temperature reaches the flanges first the flanges expand and thereby stretch the bolts. The bolts themselves do not become heated until later which causes them to expand and stretch still further. The bolts are therefore loosened and the joint is no longer tight.

The high pressures and high temperatures now encountered, moreover, render the use of thicker flanges and longer bolts necessary. This retards the heating of the bolts relative to the flanges still further and the loosening effect thereby becomes greater. It is well known that when metal parts, such as the flanges and bolts described herein, are placed under stress and simultaneously subjected to elevated temperatures these parts yield at a high rate initially and after a period of time at a slower rate. This is known as the initial creep or flow.

The total creep or flow is a function of the unit stress, the temperature and the magnitude of that portion of the part which is stressed. It follows that the greater the magnitude of the parts under stress, the greater the magnitude of the initial creep or flow. The longer bolts and thicker flanges now used have therefore aggravated a problem which has always been present, that is, to maintain a leak-proof joint under all conditions of pressure, temperatures and initial creep or flow. A joint having a high degree of flexibility is therefore highly desirable and of practical necessity in all pipe lines and particularly in those conveying fluid under high pressure and high temperature.

In the accompanying drawing wherein similar reference numerals denote corresponding parts throughout the several views—

Figure 1:
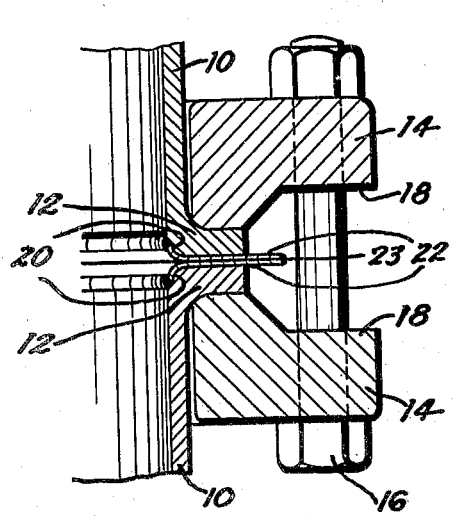
Fig. 1 is a fragmentary longitudinal section through a pair of connected pipes arranged as a joint and embodying the sealing device of this invention.

Referring more particularly to the drawing, it will be seen in Fig. 1 that a pair of pipe ends 10 are provided with outwardly extending flanges 12, the said pipe ends 10 being mechanically connected by a pair of annular flanges 14 abutting the flanges 12 and secured together as by a plurality of bolts 16, only one of which is shown. The opposing faces of the annular flanges 14, which extend beyond the flanges 12, are preferably shaped as at 18 to form, when assembled, a U-shaped opening. The internal edges of the flanges 12 are preferably rounded as at 20 to provide a flared opening at the inner edge of the connection between the pipes.

In accordance with this invention means are provided to seal the joint between the connected ends of the pipes 10, and to this end a pair of flexible plate members 22 are interposed between the flanges 12. These plate members 22 may be formed of any suitable material, but are preferably of material which may be readily welded, such as black sheet iron. The plate members are preferably of sufficient size so that when in position, as shown in Fig. 1, the outer periphery thereof will extend beyond the periphery of the flanges 12. The inner ends of the members 22 are deflected around the flared portions 20 of the flanges and secured thereto by any suitable means and preferably by welding. The outer peripheries of the plate members 22 are then secured together as will be hereinafter described also by welding at 23.

Figure 2:
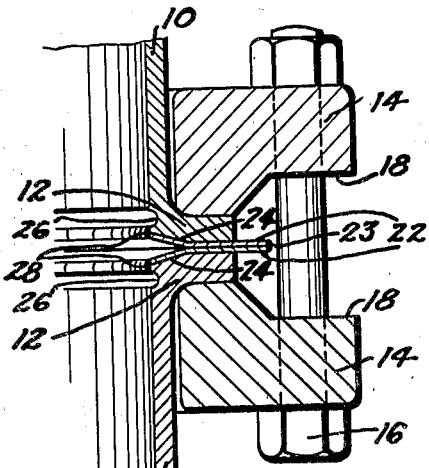
Fig. 2 is a view similar to Fig. 1 but showing a modified form of sealing device.

If desired, the flanges 12 may, as shown in Fig. 2, be flared as at 24 and provided with grooves 26 defining lips 28 adjacent the flared portions 24. The plate members 22 are, in this instance, deflected along the flared portions 24 and secured to the lip portions 28 as by welding, the lip portions serving to prevent the dissipation of the heat applied during the welding process. The outer peripheries of the plates 22 are welded at 23 as in the embodiment shown in Fig. 1.

Figure 3:
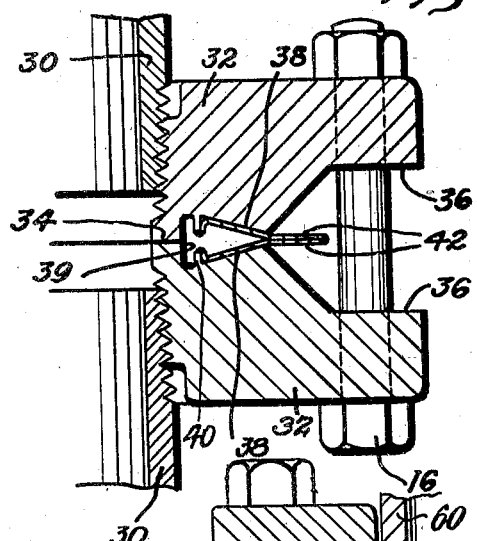
Fig. 3 is a fragmentary longitudinal section through a pair of pipe ends provided with screwed flanges and which embodies a further modified form of the sealing device of this invention.

In another embodiment of the invention, as shown in Fig. 3, a pair of pipe ends 30 are threaded for the reception of a pair of screwed flanges 32 which extend beyond the terminal ends of the pipes 30 and have a portion 34 of their opposing faces adapted to be drawn into abutting engagement as by means of the bolts 16. The outer ends of the opposing faces of the flanges 32 are shaped as at 36 to form, when in position, a U-shaped opening. Between the bottom of the U-shaped opening and the abutting ends 34 of the flanges are diverging portions 38 which, in conjunction with a recess 39, define projecting lip portions 40. The sealing device in this instance comprises a pair of annular plates 42 having their outer peripheries extending into the U-shaped opening 36 and welded together as at 23. The inner ends of the plates are deflected along the diverging portion 38 with the extreme inner edge turned inwardly along the lips 40 and their inner peripheries secured to the lips 40 as by welding.

In the assembly of the devices shown in Figs. 1, 2 and 3, it will be apparent that the inner peripheral edges of the plate members may be secured to the pipes 10 or flanges 32 at the manufacturers and the individual pipes or flanges shipped to the point of assembly as separate members. At the point of assembly the flanges are connected together as by the bolts 16, and the plate members will thereupon be brought into abutting relation. The plate members may then be welded together around the outer periphery by removing several of the bolts to provide room for the welding apparatus, the U-shaped opening facilitating such welding, and the bolts being replaced and others removed as the work proceeds around the pipe.

One advantageous feature of such construction is that as the use of alloy steel pipes and fittings is becoming more general and the welding of such material is difficult,—the necessity for welding this metal to seal a joint at the point of assembly has been eliminated. Also, the welding together of different materials under the adverse conditions encountered in the field is not necessary as the plates themselves are formed from the same material, and this material may be such as is easily welded.

Figure 4:
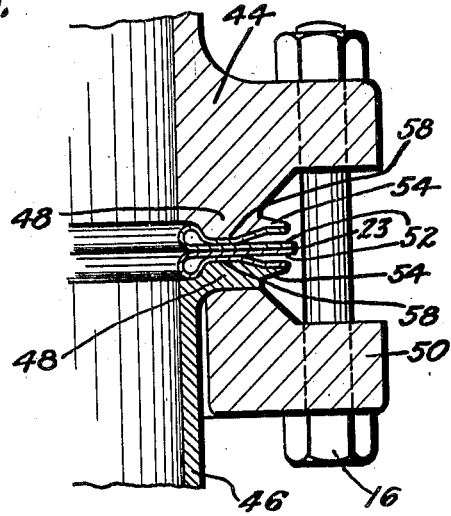
Fig. 4 is a fragmentary longitudinal section showing a connection between a fitting and a pipe and showing a still further modified form of the sealing device of this invention applied thereto.

This device is not restricted for use between the connected ends of pipes only as will be apparent from the application shown in Fig. 4. A fitting 44 is shown in conjunction with a pipe 46, each being provided with an outwardly extending flange 48. The fitting 44 and the pipe 46 are mechanically connected by means of an annular flange 50 disposed upon the pipe 46 abutting the flange 48 thereon, and having the bolts 16 extending therethrough and through the fitting 44.

In this instance, plates 52 are utilized between the adjacent ends of the flange 48 and the fitting 44, these plates being folded and of substantially U-shaped cross-section. The inner legs of the U lie face to face and are welded together at their peripheries, the outer legs being welded at their peripheries to the fitting 44 and the annular flange 50 respectively. The opposing faces of the flanges 48 may be shaped with lips 54 to facilitate welding and also have intermediate projecting portions 58. In this manner the outer legs of the U-shaped plates 52 will be separated from the inner legs and thus facilitate welding, although the intermediate portions of the plates are clamped together upon assembly.

Figure 5:
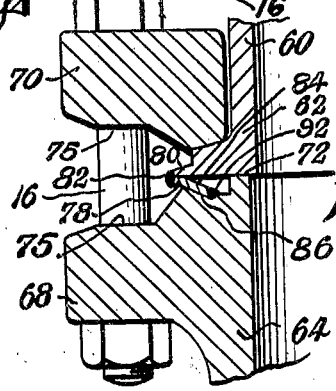
Fig. 5 is a similar view showing another modification.

As an alternative arrangement a single plate member may be interposed between the connected ends of pipes forming the joint, such an arrangement being shown in Fig. 5. A pipe end 60 having an outwardly extending flange 62 is mechanically connected, in this instance, to a fitting 64. The mechanical connection is effected as in the previously described arrangements by the bolts 16 which extend through an annular flange 68 formed on the fitting and also through an annular flange member 70 mounted on the pipe 60 abutting the flange 62 thereon.

In this embodiment the inner portion 72 of the outwardly flanged end of the pipe 60 and the inner portion 74 of the related face of the fitting 64 are normally in abutting engagement when assembled. The opposing faces of the flange member 70 and the flange 68 which extend beyond the flange 62 of the pipe are preferably shaped as at 75 to form, when assembled, a U-shaped opening.

The single plate member utilized in this instance may be interposed as shown between the fitting 64 and the pipe 60 beyond the abutting faces 74 and 72 of the fitting and pipe respectively. The outer portion 78 of the plate 76 preferably projects into the U-shaped opening described with the inner face of the projecting portion 78 abutting a lip portion 80 formed on the flange 62 of the pipe 60. The peripheral edges of the projecting portion 78 of the plate 76 and the lip portion 80 preferably lie flush and are welded together as at 82.

The inner portion 84 of the plate 76 is deflected away from the face of the flange 62 on the pipe 60 to lie against a flared portion 86 of a recess 88 formed in the face of the fitting 64 beyond the inner portion 74. The flared portion 86 preferably terminates in a chamfered shoulder 90 which cooperates with an oppositely chamfered peripheral edge on the plate member 76 to form a V-shaped opening therebetween. The V-shaped opening thus formed facilitates securing the plate 76 by its inner peripheral edge to the fitting 64 as by welding at 92.

In the assembly of the joint shown in Fig. 5 the inner periphery of the plate 76 is first welded to the fitting and then the fitting and pipe may be shipped as separate members. In the field the pipe and fitting are mechanically connected by the bolts 16 and the outer periphery of the plate 76 welded to the lip portion 80 of the pipe 60 by removing several bolts and replacing them as the work proceeds around the pipe.

In all the embodiments shown it will be observed that the flexible element is normally mechanically clamped intermediate its ends between the connected ends forming the joint and the welded portions are quite free from compression. When separation between the connected ends occurs through pressure or expansion the mechanical clamping of the flexible element is no longer present, but flexure occurs. The space thus formed between the connected ends is however sealed by the flexible element which being welded only at the peripheral edges is not strained by the separating movement.

It will be apparent that by reason of this construction the maximum amount of movement of the connected ends cannot cause leakage as the interposed element can be made sufficiently flexible to accommodate this maximum movement without strain.

It will be understood that the application of the various forms of sealing devices is not confined to the arrangements shown as each modification could be applied with equal facility to pipes, valves and fittings, or wherever a leakproof joint is required.

I claim:—

1. In combination with a pair of connected members having inner adjacent portions and outer spaced portions thereon, a sealing device interposed between said members, said sealing device comprising a flexible plate normally clamped intermediate its ends only between said inner adjacent portions and extending therebeyond between said spaced portions, said plate having one edge secured to one connected member and the other edge secured to the other connected member, said secured edges being free from clamping pressure.

2. In combination with a pair of connected members, a sealing device interposed between and extending exteriorly of said members, said sealing device comprising a pair of flexible annular plates disposed face to face and welded together along the exterior edge, the inner edge of each plate being deflected and welded to the adjacent connected member.

3. In combination with a pair of connected members having a flared portion thereon, a sealing device interposed between said members, said sealing device comprising a pair of flexible annular plates disposed face to face and secured together along one peripheral edge, the other peripheral edge of each plate being deflected along said flared portion of the adjacent connected member and being secured thereto.

4. In combination with a pair of connected members having lip portions thereon, a sealing device interposed between said members, said sealing device comprising a pair of flexible annular plates disposed face to face and secured together along one peripheral edge, the other peripheral edge of each plate being welded to the lip portion of the adjacent connected member.

5. In combination with a pair of connected members having grooved surfaces defining lip portions thereon and having flared portions adjacent said lips, a sealing device interposed between said members, said sealing device comprising a pair of flexible annular plates disposed face to face and secured together along one peripheral edge, the other peripheral edge of each plate being deflected along said flared portion and welded to the lip portion of the adjacent connected member.

6. In combination with a pair of hollow connected members having grooved surfaces defining lip portions thereon and having flared portions adjacent said lips, a sealing device interposed between and extending exteriorly of said members, said sealing device comprising a pair of annular plates disposed face to face and welded together along the exterior peripheral edge, the inner peripheral edge of each plate being deflected along said flared portion and welded to the lip portion of the adjacent connected member, thereby permitting flexible movement of each plate relative to the other and to the connected members.

7. In combination with a pair of connected members having external lip portions thereon, a sealing device interposed between said members, said sealing device comprising a pair of folded annular plates welded together along one peripheral edge, the other peripheral edge of each plate being welded to the external lip portion of the adjacent connected member.

8. In combination with a pair of connected members having external lip portions thereon, a sealing device interposed between said members, said sealing device comprising a pair of folded annular plates of U-shaped cross-section, disposed face to face, one leg of each plate having its peripheral edge welded to the peripheral edge of the other plate and the other leg of each plate being welded at its peripheral edge to the lip portion of the adjacent connected member.

9. In combination with a pair of connected members having abutting faces thereon, one of said members having a recess provided with a flared portion, a sealing device interposed between said members, said sealing device comprising a flexible plate having a portion extending within the abutting faces and a portion deflected along the flared portion of the recess, one edge of the plate being welded to one connected member adjacent the flared portion and the other edge being welded to the other connected member exteriorly of said abutting faces.

10. In a pipe joint, a pair of fluid conveying members, means to clamp said members together normally in fixed relation, and means normally clamped by said clamping means between said members and adapted to form a sealed joint therebetween, said means having deflected ends secured to the clamped members and being flexible to permit expansive and contractive movement of said members without leakage therefrom.

11. In a pipe joint, a pair of hollow fluid conveying members, means to clamp said members together normally in fixed relation, and means normally clamped by said clamping means partly between said members and adapted to form a sealed joint therebetween, said means having spaced ends secured to the interior peripheral portion of the hollow clamped members and being flexible to permit expansive and contractive movement of said members without leakage therefrom.

12. In a pipe joint, a pair of fluid conveying members, means to clamp said members together normally in fixed relation, flexible annular plate means interposed between said members, said annular plate means being normally clamped substantially along the median line between the outer and inner peripheral edges thereof by the clamping means, and a deflected portion on said annular plate means conforming to the contour of the adjacent fluid conveying member and terminally secured thereto, the flexibility of said plate means permitting expansive and contractive movement of said members without leakage therefrom.

13. In combination with a pair of connected members, a sealing device interposed between said members, said sealing device comprising a flexible element normally clamped between said members with the inner and outer peripheral portions being free from clamping pressure, said element having one free end secured to one connected member and the other free end secured to the other connected member.

14. In combination with a pair of connected members, a sealing device interposed between said members and secured thereto independently of the means connecting said members, said sealing device comprising a plurality of annular plates normally clamped between said members with the inner and outer peripheral portions of said plates being free from clamping pressure, each plate being secured to the adjoining plate along one edge and being flexibly movable relatively to each other and to the connected members.

FRENCH H. MOREHEAD.